United States Patent [19]
Lee

[11] Patent Number: 6,132,840
[45] Date of Patent: Oct. 17, 2000

[54] FIBER RESIN COMPOSITE MEMBER COMPOSITION AND MANUFACTURING METHOD THEREOF

[75] Inventor: Byung Gul Lee, 704-7 Bugok-dong, Ansan-city, Kyungki-do, Rep. of Korea

[73] Assignees: Byung Gul Lee, Ansan; Dae Youn Bark, Seoul, both of Rep. of Korea

[21] Appl. No.: 09/005,666

[22] Filed: Jan. 12, 1998

[30] Foreign Application Priority Data

Jan. 27, 1997 [KR] Rep. of Korea .......................... 97-2292

[51] Int. Cl.$^7$ ...................................................... C08J 11/04
[52] U.S. Cl. .......................... 428/113; 428/105; 428/159; 428/177; 428/206; 428/903.3
[58] Field of Search .................. 428/903.3, 98, 428/105, 113, 159, 172, 206

[56] References Cited

U.S. PATENT DOCUMENTS 5,733,943  3/1998  Doan ........................................ 521/41

*Primary Examiner*—Rich Weisberger
*Attorney, Agent, or Firm*—Darby & Darby

[57] ABSTRACT

A fiber resin composite member manufacturing method includes the steps of: selectively distinguishing waste rubber and synthetic resins containing waste tires and waste PET bottles, waste fibers, waste timbers, waste paper, waste plant straws, waste shells from shellfish or clams and so on from industrial waste materials in accordance with their physical chemical features; disintegrating the waste rubber and synthetic resins containing the waste tires and the waste PET bottles in a super low temperature cooling method, disintegrating the waste fibers in an appropriate size by using a scutcher, and distintegrating the other waste materials by means of a general crusher; pouring the disintegrated waste materials into a molding machine in a predetermined composition ratio and melting-molding them in a desired type at a high temperature of about 150 to 300° C. and a high pressure of about 150 to 3,000 ton; and cooling the molded fiber resin composite member at a temperature of about 40 to 70° C. and pressure under about 500 to 800 ton to manufacture a complete product.

1 Claim, 1 Drawing Sheet

FIBER RESIN COMPOSITE MEMBER COMPOSITION AND MANUFACTURING METHOD THEREOF

TECHNICAL FIELD

The present invention relates to a method for remaking and recycling various kinds of industrial waste materials, and more particularly, to a fiber resin composite member composition and manufacturing method thereof which can disintegrate and mix industrial waste materials such as, for example, waste tires, waste fibers, waste plastics, waste synthetic resins, waste paper, waste plant straws, waste timbers, waste shells from shellfish or clams and so on and melting-mold the disintegrated and mixed waste materials in an appropriate manner to thereby remake a fiber resin composite member.

BACKGROUND ART

With a rapid development of the industry field, it is obvious that an amount of industrial waste materials is considerably increased. Accordingly, as treatment of the increased industrial waste materials is now considered as one of important social problems to be solved, establishment of a method for treating the industrial waste materials has been needed under the concern of society groups or government. Examples of the industrial waste materials are waste tires removed out of various vehicles, baby diapers, women hygienic bands, waste fibers containing paper or clothes, kitchen plastic goods, waste plastics containing waste PET bottles, waste phenolic resins, waste paper, and waste straws containing rice straws, barley straws, wheat straws and the like.

Generally, with the development of chemical industry, a method for treating resin goods which are indispensable to maintain convenient daily lives of human bodies is emerged as an important problem, since they emit a poisonous gas during destruction by fire or are difficulty to be resolved in a natural state. Specifically, as rubber tires and plastic PET bottles are geometrically utilized, there still remain important problems to be achieved such as technical improvement which should be made to treat the waste tires and bottles, reduction of the treating cost incurred, and prevention of secondary environment contamination.

Hence, efforts to remake and recycle various industrial waste material are made as most desirable industrial waste material treating method under active concern of all advanced countries. As an example of the efforts, sand or waste cement is admixed into the waste tire removed out of vehicles to manufacture a train rail supporting member.

The train rail supporting member can not be remade or recycles, however, after it finishes the use life thereof. In addition, since waste cement or waste sand generates harmful dust during the disintegration for recycling, an additional environment contamination problem can not be avoided. Moreover, the train rail supporting member, which is manufactured by admixing the sand or waste cement into the waste tire, is fragile due to its weak strength, and since the used sand should be purchased, increment of the production cost is inevitably accompanied.

DISCLOSURE OF INVENTION

An object of the present invention is to provide to a novel fiber resin composite member composition and manufacturing method thereof which can selectively distinguish and disintegrate industrial waste materials such as, for example, waste tires, waste fibers, waste plastics, waste timbers, waste paper, waste plant straws, waste shells from shellfish or clams and so on in accordance with their physical chemical features, melting-mix the disintegrated waste materials at a high temperature and a high pressure, and mold a desired type to thereby remake a fiber resin composite member, such that dynamic recycling of waste resources as well as environment preservation are all accomplished.

To achieve this and other objects according to the present invention, there is provided a fiber resin composite member manufacturing method including the steps of: selectively distinguishing waste rubber and synthetic resins containing waste tires and waste PET bottles, waste fibers, waste timbers, waste paper, waste plant straws, waste shells from shellfish or clams and so on from industrial waste materials in accordance with their physical chemical features; disintegrating the waste tires and the waste synthetic resins containing the waste PET bottles in a super low temperature cooling method, disintegrating the waste fibers in an appropriate size by using a scutcher, and disintegrating the other waste materials by using a general crusher; pouring the disintegrated waste materials into a molding machine and melting-molding them in a desired type; and cooling the molded fiber resin composite member to manufacture a complete product.

BRIEF DESCRIPTION OF DRAWINGS

FIGURE is a flow chart illustrating manufacturing processes embodied according to the present invention.

BEST MODE FOR CARRYING OUT THE INVENTION

Figure 1:
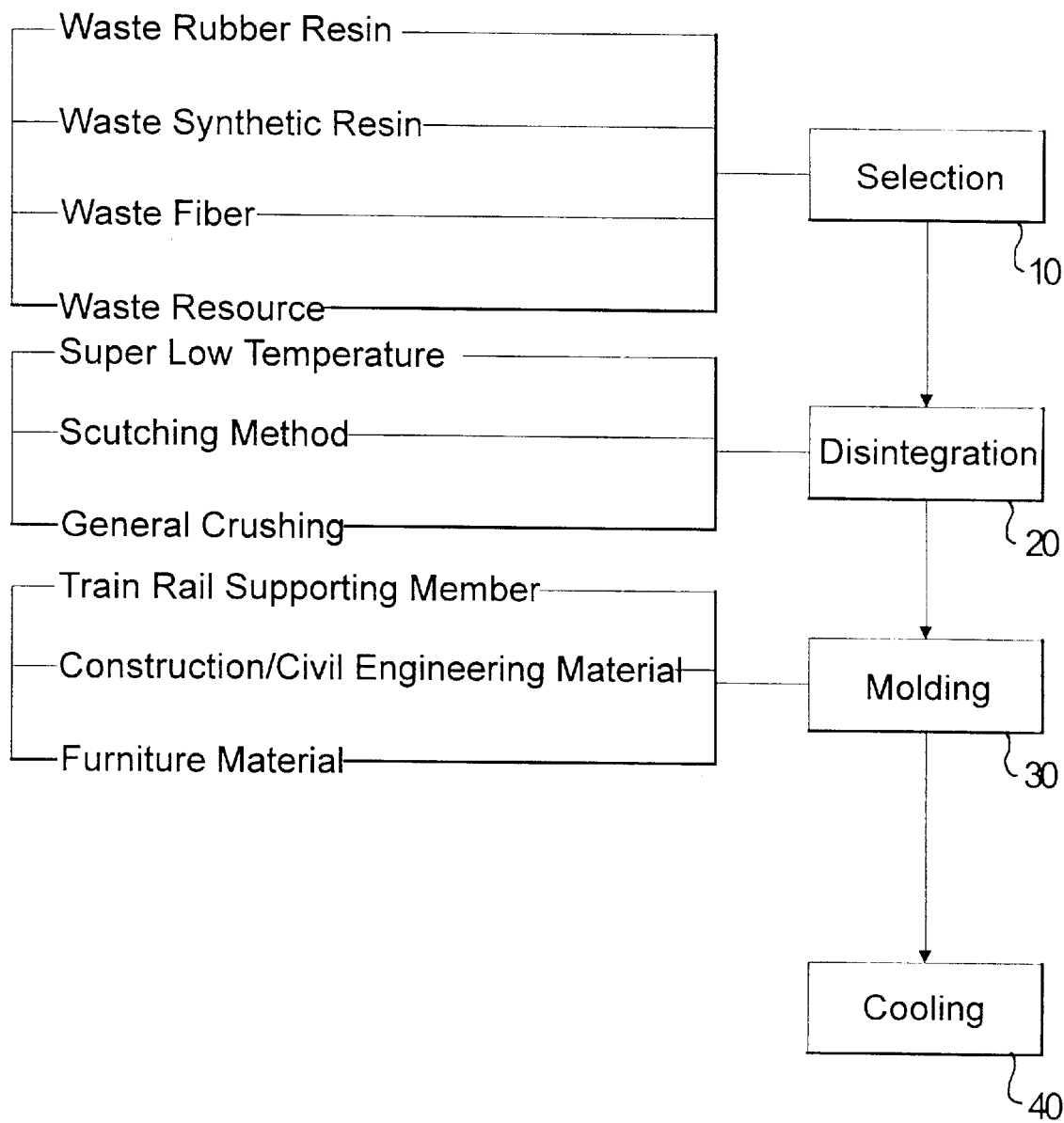

Hereinafter, an explanation on a fiber resin composite member manufacturing method embodied according to the present invention will be in detail discussed with reference to FIGURE.

Referring to FIGURE showing manufacturing processes embodied according to the present invention, at step 10 collected waste materials are firstly separated in an appropriate manner in accordance with their physical and chemical characteristics. In more detail, the waste rubber containing the waste tires is separately collected and the waste fiber containing military uniform, foreign clothes, baby diapers, women hygienic bands, sports shoes, shoes, shopping baskets, waste paper is separately collected. Also, the rubber resins as a by-product wasted upon manufacturing footwear and synthetic resin plastics containing PET bottles are each separated and collected. Further, waste resources containing the waste timbers are separately collected.

Next, step 20 of disintegrating each of the selected waste materials is entered. That is, the resins containing the waste tires, the waste PET bottles and footwear are disintegrated into a predetermined size in a super low temperature cooling method, the waste paper and the waste fibers are disintegrated into a predetermined size by using a scutcher, and the waste timbers, waste straws and waste shells are disintegrated by using a general crusher.

Then, step 30 of molding the disintegrated waste materials is entered. At the step 30, the disintegrated waste materials are melted at a high temperature and a high pressure to be a desired type and are then press-molded the molten waste materials as a new fiber resin composite member. At the time, the high temperature is at a temperature of about 150 to 300° C. and the high pressure is under about 150 to 3,000 ton.

After the completion of the molding step, step 40 of cooling the molded fiber resin composite member is entered.

At the step 40, the cooling step should meet the conditions that a temperature of about 40 to 70° C. and pressure under about 500 to 800 ton. Such the new fiber resin composite member is shaped in the molding step in accordance with the use purpose thereof and is appropriately used as an industrial member.

Now, a detailed explanation of various embodiments of the fiber resin composite member composition and a manufacturing method thereof which are made by using all kinds of industrial waste materials will be discussed.

Embodiment 1 the collected waste materials are firstly separated into the waste tires, the waste synthetic resins containing waste PET bottles, and the waste fibers. Then, the resins containing the waste tires and the waste PET bottles are disintegrated in a super low temperature cooling method, and the other waste fibers are disintegrated into a predetermined size by using a scutcher.

Next, the disintegrated waste materials are poured into a molding machine. To produce a new fiber resin composite member as a train rail supporting member, about 40–80 wt. % waste tires, about 20–30 wt. % waste fibers, about 5–30 wt. % waste plastics containing the waste PET bottles, about 10–30 wt. % waste phenolic resins are melting-mixed at a high temperature and a high pressure. The new fiber resin composite member is made, while passing through the molding step. Then, it is cooling-processed and is finally made as a complete product.

The fiber resin composite member is then molded into a train rail supporting member shape within the molding machine and is thus used as an excellent train rail supporting member. It is confirmed that the new fiber resin composite member, which is manufactured by melting and mixing the waste tires, the waste fibers and the waste plastics in the same composition ratio as the above, functions as an adequate train rail supporting member which as strength of about 100 kg/cm2 or more and a buffering force of 4.23 kg/cm2.

Embodiment 2

The waste materials such as waste tires, waste fibers, waste synthetic resins, waste shells and the like are collected, and the collected waste materials are then separated into the waste tires, the waste fibers and the waste shells in accordance with their physical and chemical characteristics. Then, the waste tires are disintegrated in a super low temperature cooling method, the waste fibers are disintegrated into a predetermined size by using a scutcher, and the waste shells are disintegrated into a general crusher.

Next, the disintegrated waste materials are poured into a molding machine To produce a new fiber resin composite member as construction/civil engineering members or furniture materials, about 20–80 wt. % waste tires, about 10–20 wt. % waste synthetic resins, about 20 wt. % waste fibers, about 10–30 wt. % waste phenolic resins and about 10–20 wt. % waste shells are mixed at a high temperature and a high pressure. The new fiber resin composite member is made, while passing through the molding step. Then, it is cooling-processed and is finally made as a complete product.

The fiber resin composite member is then used as floor materials or interior decoration materials of buildings or schools or as furniture materials such as desks or chairs, in place of expensive timber materials. Moreover, it is confirmed that if the surface of the new fiber resin composite member is polished, it can be efficiently substituted for building stone such as marble or granite. On the other hand, the new fiber resin composite member in which the waste shells are mixed exhibits a beautiful and strong surface characteristic, and it does not have any noxiousness and has excellent fire-resistance, radiation of heat and sound absorption, thus to sufficiently function as furniture materials or decoration materials.

Embodiment 3

The waste material such as waste fibers, waste synthetic resins, waste phenolic resins and the like are collected, and the collected waste materials are then separated from each other in accordance with their physical and chemical characteristics. Then, the waste synthetic resins and the waste phenolic resins are disintegrated in a super low temperature cooling method and the waste fibers are disintegrated into a predetermined size by using a scutcher.

Next, the disintegrated waste materials are poured into a molding machine. To produce a new fiber resin composite member, about 10–30 wt. % waste synthetic resins, about 40–60 wt. % waste fibers, about 10–20 wt. % waste phenolic resins are melting-mixed at a high temperature and a high pressure. The new fiber resin composite member is made, while passing through the molding step. Then, it is cooling-processed and is finally made as a complete product.

Since, therefore, the fiber resin composite member in which the waste phenolic resins are mixed has an excellent combustion-resistance and a light weight, it can be useful for the purpose of apartment building doors, desks and chairs.

Embodiment 4

The waste materials such as waste tires, waste fibers, waste plastics, waste phenolic resins, waste footwear(shoes and sports shoes), waste vinyls containing shopping baskets, bags, and passports, waste straws containing rice straws, barley straws, and wheat straws, and waste timbers are collected, and the collected waste materials are then separated from each other in accordance with their physical and chemical characteristics. Then, the waste tires, the waste vinyls and the waste phenolic resins are disintegrated in a super low temperature cooling method, the waste fibers are disintegrated into a predetermined size by using a scutcher, and the waste straws and the waste timbers are disintegrated in a predetermined size by means of a general crusher.

Next, the disintegrated waste materials are poured into a molding machine. To produce a new fiber resin composite member, about 30–70 wt. % waste tires, about 10–25 wt. % waste fibers, about 3–20 wt. % waste plastics, about 5–20 wt. % waste phenolic resins, about 1–10 wt. % waste vinyls, about 1–20 wt. % waste straws, about 3–15 wt. % waste timbers are melting-mixed at a high temperature and a high pressure. The new fiber resin composite member is made, while passing through the molding step. Then, it is cooling-processed and is finally made as a complete product.

Since, therefore, the fiber resin composite member in which the waste phenolic resins are mixed has excellent combustion-resistance and waster-resistance and a light weight, it can be useful for the purpose of construction materials, materials for use of desks and chairs, and shipping manufacturing materials.

INDUSTRIAL APPLICABILITY

As apparent from the foregoing, a novel fiber resin composite member composition and manufacturing method thereof embodied according to the present invention can selectively distinguish and disintegrate industrial waste materials such as, for example, waste tire, waste fiber, waste plastic, waste timber, waste paper, waste straw timber, shell and so on in accordance with their physical chemical features, melting-mix the disintegrated waste materials at a high temperature and a high pressure, and mold a desired type to thereby reproduce a fiber resin composite member, such that the fiber resin composite member can be used as train rail supporting members, shipping manufacturing materials, or construction/civil engineering materials or furniture materials at the expense of a low production cost as well as provides desirable advantages in that dynamic recycling of waste resources and environment preservation are all accomplished.

Moreover, even in the case where after the train rail supporting members, or the construction/civil engineering materials or furniture materials finish their own cycle lives, they are waste, they can be remade for the recycling thereof, without generating dust or harmful materials, such that the fiber resin composite member can increase an amount of national resource and ensure rapid development of industry fields.

What is claimed is:

1. Train rail supporting members produced by the process comprising the steps of:

selectively distinguishing waste tires, waste plastics, waste phenolic resins and waste fibers from industrial waste materials, said industrial waste materials including waste rubber containing tires, waste synthetic resins containing plastics, phenolic resins and vinyls, waste fibers, waste timbers, waste paper, waste plant straws, waste shells of shellfish, and waste shells of clams;

disintegrating said waste tires, said plastics and said phenolic resins in super low temperature cooling method, and disintegrating said waste fibers in an appropriate size by using a scutcher;

pouring the disintegrated waste materials in a composition having said waste tires of about 40–80 wt %, said waste fibers of about 20–30 wt %, said waste plastics of about 5–30 wt % and said waste phenolic resins of about 10–30 wt %, into a molding machine and melting and molding the waste materials in a mold at a temperature of between about 150 and 300° C. and a pressure of between about 150 and 3,000 tons; and cooling the molded fiber resin composite member at a temperature of between about 40 and 70° C. and at a pressure below about 500 to 800 tons.

* * * * *